(12) United States Patent
Ootake et al.

(10) Patent No.: US 9,227,658 B2
(45) Date of Patent: Jan. 5, 2016

(54) ROTARY ELECTRIC MACHINE CONTROL APPARATUS HAVING ABNORMALITY DETECTION FUNCTION

(71) Applicant: DENSO CORPORATION, Kariya, Aichi-pref. (JP)

(72) Inventors: Hiroyasu Ootake, Gamagori (JP); Daisuke Kobayashi, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/306,513

(22) Filed: Jun. 17, 2014

(65) Prior Publication Data
US 2015/0012178 A1   Jan. 8, 2015

(30) Foreign Application Priority Data
Jul. 3, 2013   (JP) ................................ 2013-139755

(51) Int. Cl.
*B62D 5/00*   (2006.01)
*B62D 5/04*   (2006.01)

(52) U.S. Cl.
CPC .............. *B62D 5/0487* (2013.01); *B62D 5/049* (2013.01); *B62D 5/0481* (2013.01)

(58) Field of Classification Search
CPC ............ B62D 5/00; B62D 5/04; B62D 5/046; B62D 5/0463; B62D 5/0481; B62D 5/0487; B62D 5/049
USPC .............. 701/41–44; 318/445, 454, 455, 638; 180/6.44, 400, 412, 416, 443
See application file for complete search history.

(56) References Cited

U.S. PATENT DOCUMENTS

| | | | | |
|---|---|---|---|---|
| 5,369,349 | A |   | 11/1994 | Tsuchiya et al. |
| 5,467,281 | A | * | 11/1995 | Iwashita et al. ................. 701/41 |
| 5,907,277 | A | * | 5/1999 | Tokunaga ..................... 340/441 |

(Continued)

FOREIGN PATENT DOCUMENTS

| | | |
|---|---|---|
| DE | 10 2007 033 145 | 1/2009 |
| JP | 2001-008488 | 1/2001 |

(Continued)

OTHER PUBLICATIONS

Office Action (2 pages) dated Apr. 21, 2015, issued in corresponding Japanese Application No. 2013-139755 and English translation (2 pages).

(Continued)

*Primary Examiner* — Thomas Tarcza
*Assistant Examiner* — Tyler J Lee
(74) *Attorney, Agent, or Firm* — Nixon & Vanderhye P.C.

(57) ABSTRACT

A rotary electric machine control apparatus controls driving of a motor, which generates assist torque in accordance with steering torque inputted by steering operation on a steering wheel. An abnormality detection part acquires a voltage detection value related to an operation parameter, which varies when the motor is being supplied with electric power. The abnormality detection part checks whether the voltage detection value is abnormal based on a variation of the voltage detection value over a predetermined period under a condition that the electric power is supplied to the motor and the steering member is being operated. It is thus possible to determine abnormality of the voltage detection value related to the operation parameter, which varies when the motor is in operation with electric power supply, without erroneous detection.

7 Claims, 5 Drawing Sheets

(56) References Cited

U.S. PATENT DOCUMENTS

| | | | |
|---|---|---|---|
| 5,984,042 A * | 11/1999 | Nishimoto et al. | 180/446 |
| 6,246,197 B1 * | 6/2001 | Kurishige et al. | 318/432 |
| 6,332,506 B1 * | 12/2001 | Kifuku | 180/443 |
| 6,798,161 B2 * | 9/2004 | Suzuki | 318/434 |
| 6,941,207 B2 * | 9/2005 | Matsubara et al. | 701/41 |
| 7,016,775 B2 * | 3/2006 | Iwazawa et al. | 701/41 |
| 7,157,877 B2 * | 1/2007 | Hirochi et al. | 318/400.01 |
| 2003/0155172 A1 * | 8/2003 | Kawada et al. | 180/446 |
| 2003/0179004 A1 * | 9/2003 | Fukusumi et al. | 324/713 |
| 2004/0113584 A1 | 6/2004 | Jinbo | |
| 2005/0184688 A1 | 8/2005 | Hirochi et al. | |
| 2009/0105907 A1 * | 4/2009 | Yamaguchi et al. | 701/41 |
| 2010/0070137 A1 * | 3/2010 | Yamaguchi et al. | 701/41 |
| 2011/0071730 A1 * | 3/2011 | Nakai | 701/42 |
| 2013/0314013 A1 * | 11/2013 | Ajima et al. | 318/400.21 |
| 2014/0054103 A1 * | 2/2014 | Kezobo et al. | 180/446 |

FOREIGN PATENT DOCUMENTS

| | | |
|---|---|---|
| JP | 2005-88709 | 4/2005 |
| JP | 2005-153570 | 6/2005 |
| JP | 2007-223435 | 9/2007 |
| JP | 2012-72733 | 4/2012 |
| JP | 2012-223001 | 11/2012 |

OTHER PUBLICATIONS

Office Action (5 pages) dated Oct. 22, 2015, issued in corresponding German Application No. 10 2014 106 716.9 and English translation (5 pages).

* cited by examiner

ROTARY ELECTRIC MACHINE CONTROL APPARATUS HAVING ABNORMALITY DETECTION FUNCTION

CROSS REFERENCE TO RELATED APPLICATION

This application is based on and incorporates herein by reference Japanese patent application No. 2013-139755 filed on Jul. 3, 2013.

FIELD

The present invention relates to a rotary electric machine control apparatus having an abnormality detection function.

BACKGROUND

A conventional rotary electric machine control apparatus AD-converts information related to a phase voltage, a phase current and the like, acquires those AD-converted values and controls driving of a rotary electric machine based on those acquired AD values. The AD values are acquired via input terminals and the like. In a case that characteristics of the AD values acquired via input terminals adjacent to each other are similar, it is hard to determine whether the similarity of the AD values results from temporary coincidence without any abnormality or from a short-circuit between the input terminals.

In JP-A-2005-245053, input terminals adjacent to each other are arranged to receive AD values of different characteristics. However, according to this arrangement of terminals, hardware construction is restricted. For example, input terminals for acquiring phase terminal voltages of a rotary electric machine cannot be arranged adjacently to each other.

SUMMARY

It is therefore an object to provide a rotary electric machine control apparatus, which is capable of detecting abnormality of a voltage detection value related to an operation parameter varying when a rotary electric machine is in operation with power supply.

According to one aspect, a rotary electric machine control apparatus is provided for controlling driving of a rotary electric machine, which generates assist torque in accordance with steering torque inputted by steering operation on a steering member. The rotary electric machine control apparatus comprises a voltage signal acquisition part, a power supply check part, a steering check part and an abnormality detection part. The voltage signal acquisition part acquires a voltage detection value related to an operation parameter, which varies when the rotary electric machine is in operation with electric power supply. The power supply check part checks whether electric power is supplied to the rotary electric machine. The steering check part checks whether the steering member is in operation. The abnormality detection part checks whether the voltage detection value is abnormal based on a variation of the voltage detection value over a predetermined period under a condition that the rotary electric machine is in operation and the steering member is in operation.

EMBODIMENT

Figure 1:
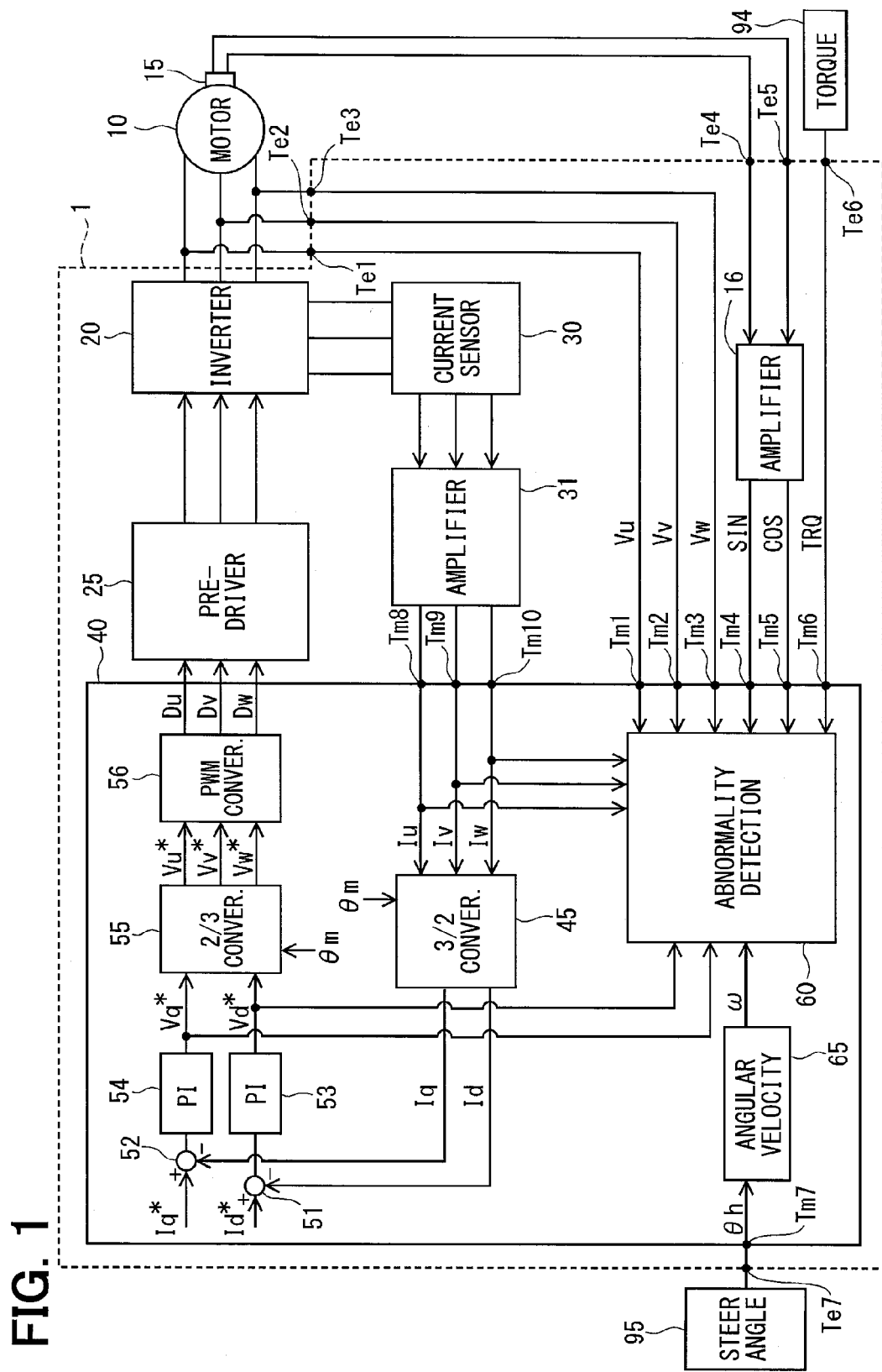
FIG. 1 is a block diagram showing a rotary electric machine control apparatus according to a first embodiment.

A rotary electric machine control apparatus will be described below with reference to plural embodiments shown in the accompanying drawings. In the plural embodiments described below, substantially the same parts are designated with same reference numerals thereby to simplify the description.

First Embodiment

A rotary electric machine control apparatus according to a first embodiment is shown in FIG. 1. A rotary electric machine control apparatus 1 is for controlling driving of a motor 10, which is a rotary electric machine. The control apparatus 1 is formed of an electronic control unit (ECU) and used with the motor 10 for, for example, an electric power steering apparatus 100 shown in FIG. 2, which power-assists a steering operation of a vehicle.

Figure 2:
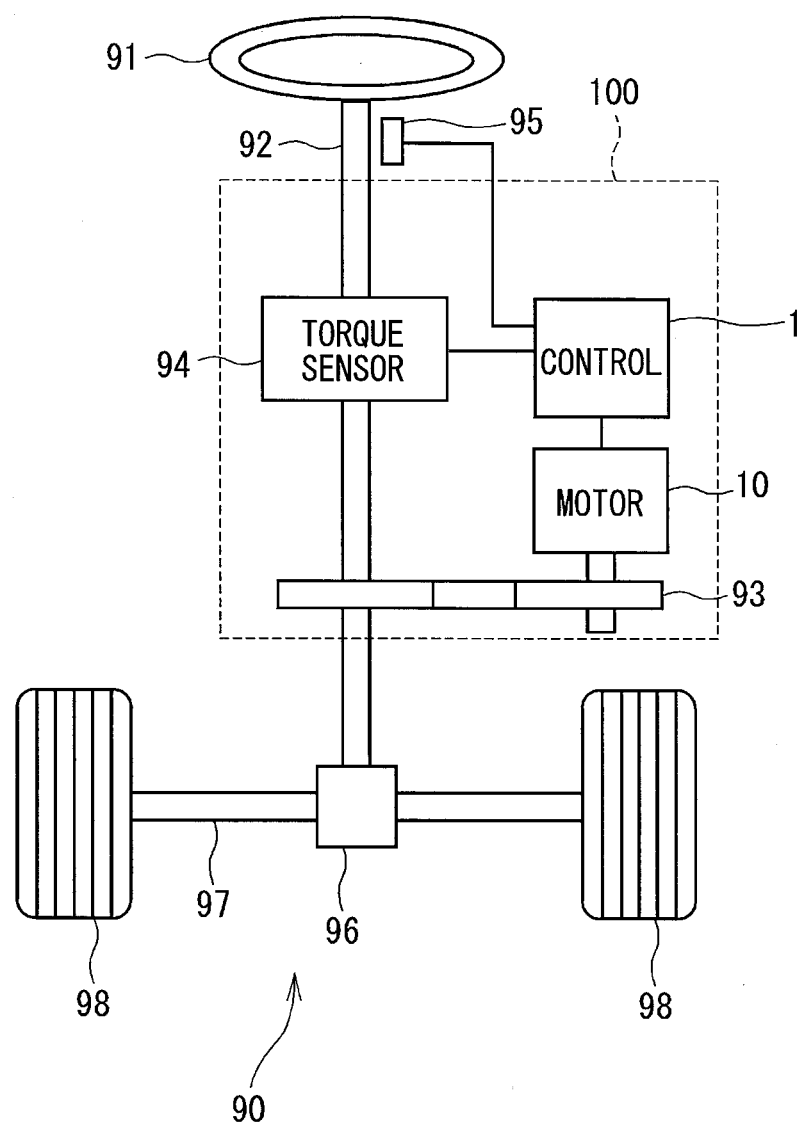
FIG. 2 is a schematic view showing an electric power steering apparatus, which incorporates the rotary electric machine control apparatus according to the first embodiment.

As shown in FIG. 2, the electric power steering apparatus 100 is provided in a steering system 90. The steering system 90 includes a steering wheel (handle) 91 as a steering member, a steering shaft 92, a pinion gear 96, a rack shaft 97, tire wheels 98 and the like in addition to the electric power steering apparatus 100.

The steering wheel 91 is coupled with the steering shaft 92. A torque sensor 94 is provided on the steering shaft 92 to detect a steering torque inputted when a driver operates the steering wheel 91. The torque sensor 94 outputs a torque signal TRQ indicative of the steering torque to a control unit 40 shown in FIG. 1. A steering angle sensor 95 is provided on the steering shaft 92 to detect a steering angle θh of the steering wheel 91. The steering angle sensor 95 outputs a steering angle signal related to the steering angle θh to the control unit 40 (FIG. 1). The pinion gear 96 is provided at a bottom end of the steering shaft 92. The pinion gear 96 is engaged with the rack shaft 97. The tire wheels 98 are coupled to both ends of the rack shaft 97 through tie rods and the like.

Thus the steering shaft 92, which is coupled to the steering wheel 91, is rotated when a driver operates the steering wheel 91. Rotary movement of the steering shaft 92 is converted to linear movement of the rack shaft 97 by the pinion gear 96 so that the pair of tire wheels 98 is steered to an angle corresponding to the amount of movement of the rack shaft 97.

The electric power steering apparatus 100 includes the motor 10, which generates the assist torque for power-assisting the steering operation of the driver on the steering wheel 91, the control apparatus 1, which controls driving of the motor 10, a reduction gear 93, which transfers rotation of the motor 10 to the steering shaft 92 or the rack shaft 97 after speed reduction, and the like. The motor 10 rotates the reduction gear 93 in forward and reverse directions. The electric power steering apparatus 100 thus generates the assist torque for power-assisting the steering operation of the steering wheel 91 from the motor 10 and transfers the assist torque to the steering shaft 92 or the rack shaft 97 through the reduction gear 93.

The motor 10 is a three-phase brushless motor, which is driven with electric power supplied from a battery (not shown). The motor 10 may be any motor other than the three-phase brushless motor. The motor 10 has a rotor and a stator, which are not shown. The rotor is a cylindrical member, on an outer surface or an inner surface of which permanent magnets are attached to provide magnetic poles. The stator has protrusions, which protrude radially inward at every predetermined angular interval in a peripheral direction. A U-phase coil, a V-phase coil and a W-phase coil are wound about those protrusions. As shown in FIG. 1, a rotation angle sensor 15 is provided in the motor 10 to detect an electric angle θm, which indicates a rotation position of the rotor. The rotation angle sensor 15 outputs rotation signals SIN and COS, which are related to the electric angle θm, to the control unit 40 through an amplifier circuit 16.

As shown in FIG. 1, the control apparatus 1 is formed of an electronic control unit (ECU) and includes an inverter part 20, a current sensor part 30, a control unit 40, connectors for connection with external parts, and the like. The inverter part 20 is a three-phase inverter, in which six switching elements are connected in a bridge form. Each switching element is, for example, a MOSFET (metal-oxide-semiconductor field-effect transistor), which is one type of field-effect transistors. The switching element is not limited to the MOSFET and may be an IGBT, a thyristor or the like. Of the two switching elements, which form a switching element pair (arm), one is connected at a high-potential side (power supply line) and the other is connected at a low-potential side (ground line). Three switching element pairs are connected to the U-phase coil, the V-phase coil and the W-phase coil of the motor 10, respectively.

On-off operations of the switching elements of the inverter part 20 are controlled by the control unit 40 through a pre-driver 25 so that the electric power supplied from the battery is converted and supplied to the motor 10. A power relay (not shown), which is capable of interrupting supply of the electric power from the battery to the inverter part 20, is provided between the battery and the inverter part 20.

The current sensor part 30 is formed of shunt resistors, for example, each of which is provided between each of the switching element pairs and ground. Terminal voltages of the shunt resistors are outputted to the control unit 40 through the amplifier circuit 31.

The control unit 40, which controls entirety of the control apparatus 1, is formed of a microcomputer, which executes various arithmetic processing. The control unit 40 is formed of a three-phase/two-phase (3/2) conversion part 45, subtractors 51, 52, PI control parts 53, 54, two-phase/three-phase (2/3) conversion part 55, a PWM conversion part 56, an abnormality detection part 60, a steering angular velocity calculation part 65 and the like. The three-phase/two-phase conversion part 45, the subtractors 51, 52, the PI control parts 53, 54, the two-phase/three-phase conversion part 55, the PWM conversion part 56, the abnormality detection part 60 and the steering angular velocity calculation part 65 may be configured by software or hardware. Alternatively they may be configured by a combination of software and hardware.

The three-phase/two-phase conversion part 45 acquires through the amplifier circuit 31 a U-phase current signal, a V-phase current signal and a W-phase current signal, which are related to the U-phase current Iu, the V-phase current Iv and the W-phase current Iw actually supplied to the motor 10 and acquired by the current sensor part 30, respectively. In the following description, the U-phase current signal, the V-phase current signal and the W-phase current signal are simply referred to as the U-phase current Iu, the V-phase current Iv and the W-phase current Iw, respectively. The U-phase current Iu, the V-phase current Iv and the W-phase current Iw are also referred to as phase currents Iu, Iv and Iw, when appropriate.

The three-phase/two-phase conversion part 45 performs d-q conversion based on the electric angle θm so that the U-phase current Iu, the V-phase current Iv and the W-phase current Iw are converted to a d-axis current Id and a q-axis current Iq. Thus the U-phase current Iu, the V-phase current Iv and the W-phase current Iw are converted from a three-phase coordinate to a d-q coordinate.

The subtractor 51 calculates a d-axis current difference ΔId, which is a difference between a d-axis current command value Id* and the d-axis current Id. The subtractor 52 calculates a q-axis current difference ΔIq, which is a difference between a q-axis current command value Iq* and the q-axis current Iq. The d-axis current command value Id* and the q-axis current command value Iq* are calculated by a command calculation part (not shown) in accordance with a steering torque, a vehicle speed and the like.

The PI control part 53 calculates a d-axis voltage command value Vd* by PI calculation based on the d-axis current difference ΔId, which is inputted from the subtractor 51, so that the d-axis current Id, which is an actual current, follows the d-axis current command value Id*. The PI control part 54 calculates a q-axis voltage command value Vq* by PI calculation based on the q-axis current difference ΔIq, which is inputted from the subtractor 52, so that the q-axis current Iq, which is an actual current, follows the q-axis current command value Iq*.

The two-phase/three-phase conversion part 55 performs inverse d-q conversion based on the electric angle θm thereby to convert the d-axis voltage command value Vd* and the q-axis voltage command value Vq* to voltage command values of three phases, which are a U-phase voltage command value Vu*, a V-phase voltage command value Vv* and a W-phase voltage command value Vw*. The PWM conversion part 56 calculates a U-phase duty command value Du, a V-phase duty command value Dv and a W-phase command value Dw, each of which corresponds to a ratio of an on-period of the switching elements of a corresponding phase, based on the U-phase voltage command value Vu*, the V-phase voltage command value Vv*, and the W-phase voltage command value Vw*, respectively.

The U-phase duty command value Du, the V-phase duty command value Dv and the W-phase duty command value Dw outputted from the PWM conversion part 56 are converted to drive signals by the pre-driver 25. Based on the drive signals, the switching elements of the inverter part 20 are turned on and off. The control unit 40 thus PWM-controls the motor 10 through the control unit 40.

The abnormality detection part 60 performs an abnormality detection on voltage detection values acquired by the control unit 40. The voltage detection values acquired by the control unit 40 will be described here. In this embodiment, connector terminals provided in an electric connector of the rotary machine control apparatus 1 is indicated as Te and input terminals provided in the control unit 40 are indicated as Tm.

The control unit 40 acquires the U-phase terminal voltage Vu through a connector terminal Te1 and an input terminal Tm1, the V-phase terminal voltage Vv through a connector terminal Te2 and an input terminal Tm2 and the W-phase terminal voltage Vw through a connector terminal Te3 and an input terminal Tm3.

The control unit 40 acquires the rotation signals SIN and COS related to the electric angle θm from the rotation angle sensor 15 through connector terminals Te4, Te5, the amplifier circuit 16 and input terminals Tm4, Tm5. The electric angle θm is calculated based on the acquired rotation signals SIN and COS by an angle calculation part (not shown). The electric angle θm is used for d-q conversion in the three-phase/two-phase conversion part 45 and for inverse d-q conversion in the two-phase/three-phase conversion part 55.

The control unit 40 acquires a torque signal TRQ from the torque sensor 94 through a connector terminal Te6 and an input terminal Tm6. The torque signal TRQ is used for calculating the d-axis current command value Id* and the q-axis current command value Iq* as well as other values. The control unit 40 acquires the steering angle signal θh from the steering angle sensor 95 through a connector terminal Te7 and an input terminal Tm7. The steering angular velocity calculation part 65 calculates the steering angular velocity ω based on the steering angle θh.

The control unit 40 acquires the U-phase current signal related to the U-phase current Iu through an input terminal Tm8, the V-phase current signal related to the V-phase current Iv through an input terminal Tm9 and the W-phase current signal related to the W-phase current Iw through an input terminal Tm10. Since each phase current signal related to the phase current Iu, Iv and Iw is acquired internally in the control apparatus 1, no connector terminal is provided for each phase current signal.

The connector terminals Te1 to Te7 are arranged side by side in the listed order. Further, the input terminals Tm1 to Tm10 are arranged side by side in the listed order. The U-phase terminal voltage Vu, the V-phase terminal voltage Vv, the W-phase terminal voltage Vw, the U-phase current signal, the V-phase current signal, the W-phase current signal, the rotation signals SIN, COS, the torque signal TRQ and the steering angle signal are all AD-converted values. These values correspond to voltage detection values related to operation parameters, which vary when the current flows in the motor 10.

Figure 3:
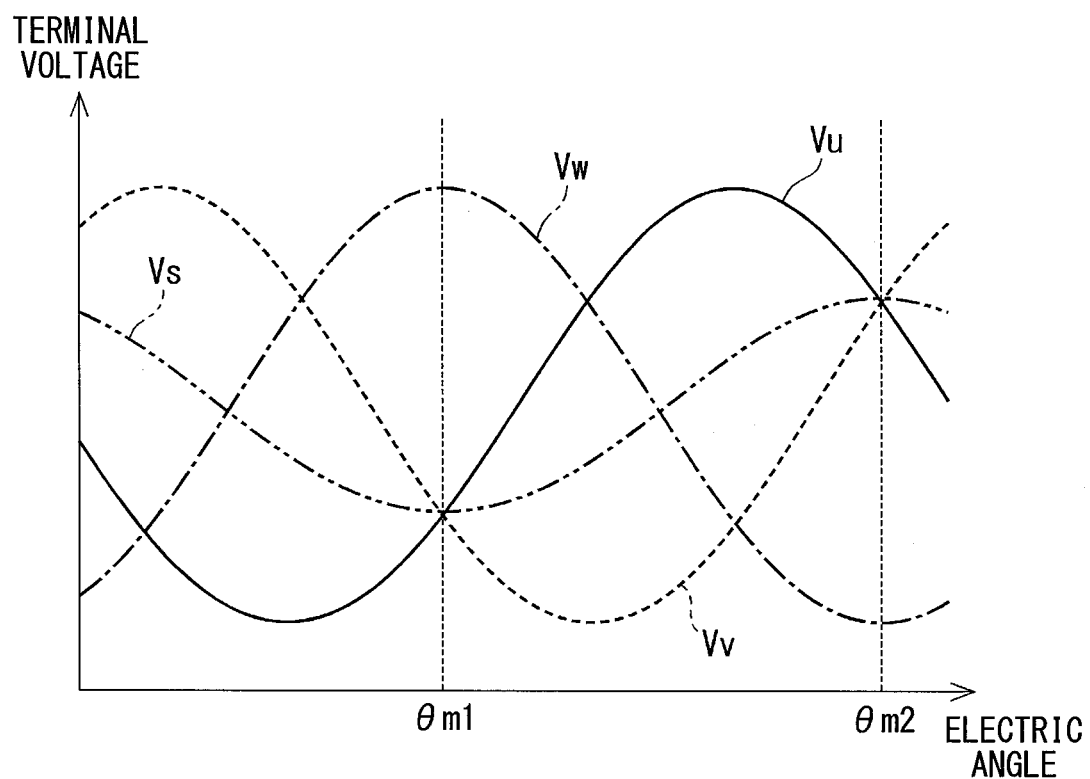
FIG. 3 is a waveform chart showing each phase terminal voltage in the first embodiment.

Each of the phase terminal voltages Vu, Vv and Vw will be described here with reference to FIG. 3. As shown in FIG. 3, each phase voltage Vu, Vv, Vw is in a sine waveform normally. The U-phase terminal voltage Vu and the V-phase terminal voltage Vv are equal to each other at electric angles θm1 and θm2.

The input terminal Tm1 for acquiring the U-phase terminal voltage Vu and the input terminal Tm2 for acquiring the V-phase terminal voltage Vv are located adjacently, that is, side by side. Under this arrangement, when the input terminal Tm1 and the input terminal Tm2 are short-circuited, the U-phase terminal voltage Vu and the V-phase terminal voltage Vv become equal to each other irrespective of the electric angle θm, that is, at electric angles other than θm1 and θm2. It is assumed here that the input terminals of the control unit 40 are short-circuited. However the same situation arises when voltage acquisition paths, which include the input terminals and the connector terminals, for the U-phase terminal voltage Vu and the V-phase terminal voltage Vv are short-circuited. In the following description, an inter-terminal short-circuit includes a short-circuit of such an acquisition path.

That is, the U-phase terminal voltage Vu and the V-phase terminal voltage Vv equal each other when an inter-terminal short-circuit arises. The U-phase terminal voltage Vu and the V-phase terminal voltage Vv become equal to each other depending on the electric angle, for example, at θm1 and θm2, even in a normal case (no abnormality). For this reason, in a case that the motor 10 is at rest at the electric angle θm1, for example, the U-phase terminal voltage Vu and the V-phase terminal voltage Vv continues to be equal even when no abnormality arises. It is thus difficult to distinguish whether an inter-terminal short-circuit abnormality is present or not and detect the inter-terminal short-circuit abnormality accurately.

Two voltage detection values such as the U-phase terminal voltage Vu and the V-phase terminal voltage Vv whose voltage values are equal to each other even in the normal time, are referred to as voltage detection values of similar characteristics. It is possible to detect the inter-terminal short-circuit abnormality by locating the input terminals, to which the voltage detection values of similar characteristics are inputted, at physically separated positions and making the voltage detection value generated at the time of occurrence of the inter-terminal short-circuit abnormality and the voltage detection value of the normal time differ from each other. It is however limited that the terminal for acquiring the U-phase terminal voltage Vu and the terminal for acquiring the V-phase terminal voltage Vv cannot be arranged adjacently to each other. Thus degree of freedom in designing arrangement of terminals is lowered.

Therefore, the abnormality detection processing is designed to detect the inter-terminal short-circuit abnormality even in a case that the voltage detection values of similar characteristics are inputted to the input terminals located adjacently. The following description will be made with reference to the U-phase terminal voltage Vu and the V-phase terminal voltage Vv as one example. It is also possible to check the inter-terminal short-circuit abnormality of other voltage detection values such as the W-phase terminal voltage by similar processing.

The abnormality detection processing will be described with reference to a flowchart shown in FIG. 4. The abnormality detection processing is executed by the abnormality detection part 60 at every predetermined interval while ignition power is being supplied, for example. At first step S101 (step is simply denoted as S below), the d-axis voltage command value Vd* and the q-axis voltage command value Vq*, which are calculated by the PI control parts 53 and 54, respectively, are acquired.

At S102, the steering angular velocity ω, which is calculated by the steering angular velocity calculation part 65, is acquired. At S103, the U-phase terminal voltage Vu and the V-phase terminal voltage Vv are acquired. At S104, it is checked whether the motor 10 is in operation, that is, powered with electric power supply. It is determined that the motor 10 is in operation with electric power supply when a sum of square values of the d-axis voltage command value Vd* and the q-axis voltage command value Vq* is equal to or larger than a current supply comparison threshold value Xi, that is, $(Vd^*)^2+(Vq^*)^2 \geq Xi$. Here, since the sum of squares of the d-axis voltage command value Vd* and the q-axis voltage command value Vq* is substantially zero, the current supply comparison threshold value Xi is set to a value, which is close to zero (0), in consideration of sensor errors or the like. When it is determined that the motor 10 is not in operation with electric power supply (S104:NO), that is, $(Vd^*)^2+(Vq^*)^2<Xi$, S105 to S109 are not executed. When it is determined that the motor 10 is in operation with electric power supply (S104:YES), that is, $(Vd^*)^2+(Vq^*)^2 \geq Xi$, S105 is executed.

At S105, it is checked whether the steering wheel 91 is being steered, that is, in operation. It is determined based on the steering angular velocity ω, the steering wheel 91 is in operation when the steering angular velocity ω is equal to or larger than the steering comparison threshold value Xω. Here, since it is checked whether the steering angular velocity ω is substantially zero or not, the steering comparison threshold value $X\omega$ is set to a value close to zero in consideration of sensor errors or the like. When it is determined that the steering wheel 91 is not in operation (S105:NO), that is, the steering angular velocity $\omega$ is smaller than the steering comparison threshold value $X\omega$, S106 to S109 are not executed. When it is determined that the steering wheel 91 is in operation (S105: YES), that is, the steering angular velocity $\omega$ is equal to or larger than the steering comparison threshold value $X\omega$, S106 is executed.

At S106, it is checked whether the U-phase voltage and the V-phase voltage equal each other. It is determined that the U-phase terminal voltage Vu and the V-phase terminal voltage Vv equal each other when an absolute value of a difference between the U-phase terminal voltage Vu and the V-phase terminal voltage Vv is equal to or smaller than a short-circuit comparison threshold value Xs. The short-circuit comparison threshold value Xs is set to a value close to zero in consideration of sensor errors or the like. When it is determined that the U-phase terminal voltage Vu and the V-phase terminal voltage Vv do not equal each other (S106:NO), that is, the absolute value of the difference between the U-phase terminal voltage Vu and the V-phase terminal voltage Vv is equal to or larger than the short-circuit comparison threshold value Xs, S107 to S109 are not executed. When it is determined that the U-phase terminal voltage Vu and the V-phase terminal voltage Vv equal each other (S106:YES), that is, the absolute value of the difference between the U-phase terminal voltage Vu and the V-phase terminal voltage Vv is smaller than the short-circuit comparison threshold value Xs, S107 is executed. A count value C, which will be described below, is reset when check result (determination) of any one of S104 to S106 is NO.

At S107, the count value C of a counter is incremented. At S108, it is checked whether the U-phase terminal voltage Vu and the V-phase terminal voltage Vv equal each other continuously for more than a predetermined period. It is determined that the U-phase terminal voltage Vu and the V-phase terminal voltage Vv equal each other continuously for more than the predetermined period when the count value C is larger than a count comparison threshold value Xc.

The count comparison threshold value Xc is set to correspond to a predetermined period, which is related to the abnormality detection. When it is determined that the U-phase terminal voltage Vu and the V-phase terminal voltage Vv do not equal each other continuously for more than the predetermined period (S108:NO), that is, the count value C is equal to or smaller than the count comparison threshold value Xc, S109 is not executed. When the detection result at S108 is NO, the count value C is not reset but maintained. When it is determined that the U-phase terminal voltage Vu and the V-phase terminal voltage Vv equal each other continuously for more than the predetermined period (S108:YES), that is, the count value C is larger than the count comparison threshold value Xc, S109 is executed. At S109, it is determined that the U-phase terminal voltage Vu and the V-phase terminal voltage Vv are abnormal. Specifically, it is so determined that the inter-terminal short-circuit abnormality, in which the acquisition path for acquiring the U-phase terminal voltage Vu and the acquisition path for acquiring the V-phase terminal voltage Vv are short-circuited, is present.

That is, when the motor 10 is not in operation with electric power supply or the steering wheel 91 is not in operation, the U-phase terminal voltage Vu and the V-phase terminal voltage Vv do not change. For this reason, the U-phase terminal voltage and the V-phase terminal voltage continues to equal each other at certain electric angles $\theta m$, even when no inter-terminal short-circuit is present. If it is so determined that the inter-terminal short-circuit is present based on equality of the U-phase terminal voltage Vu and the V-phase terminal voltage Vv under a state that the motor 10 is not in operation with electric power supply or the steering wheel 91 is not in operation, it is likely that the inter-terminal short-circuit abnormality is erroneously determined as being present at some electric angles $\theta m$ although no such abnormality is present.

For this reason, in the first embodiment, the inter-terminal short-circuit abnormality detection is not performed when the motor 10 is not in operation with electric power supply (S104: NO) or the steering wheel 91 is not in operation (S105:NO). It is thus possible to avoid erroneous detection of presence of the inter-terminal short-circuit contrary to no presence of actual inter-terminal short-circuit and to detect the inter-terminal short-circuit abnormality correctly.

As described above, the control apparatus 1 controls driving of the motor 10, which generates the assist torque in accordance with the steering torque inputted by the steering operation of the driver on the steering wheel 91. The abnormality detection part 60 acquires the voltage detection value related to the operation parameter, which varies when the motor 10 is supplied with electric power supply.

The abnormality detection part 60 checks whether the motor 10 is in operation with electric power supply (S104). The abnormality detection part 60 further checks whether the steering wheel 91 is in operation (S105). When the motor 10 is in operation with electric power supply and the steering wheel 91 is in operation (S104:YES and S105:YES), it is checked whether the voltage detection values are normal or abnormal based on the variation of the voltage detection values over the predetermined period.

When the motor 10 is in operation with electric power supply and the steering wheel 91 is in operation, the voltage detection value related to the operation parameter (for example, each terminal voltage Vu, Vv, Vw and the like), which varies when the motor 10 is being supplied with electric power supply, varies. Therefore, when the motor 10 is in operation with electric power supply and the steering wheel 91 is in operation, it is checked whether the voltage detection value is normal or abnormal based on the variation of the voltage detection value over the predetermined period. That is, it is not checked whether the voltage detection value is normal or abnormal when the voltage detection value is likely to vary similarly between the normal case and the abnormal case over the predetermined period. It is thus possible to avoid erroneous detection of abnormality contrary to no actual abnormality and determine the abnormality of the voltage detection value related to the operation parameter, which varies when the current is supplied to the motor 10.

Specifically, the abnormality detection part 60 acquires the first voltage detection value and the second voltage detection value as the voltage detection value. The first voltage detection value and the second voltage detection value are assumed to be the U-phase terminal voltage and the V-phase terminal voltage.

The abnormality detection part 60 determines that the U-phase terminal voltage Vu and the V-phase terminal voltage Vv are abnormal when the U-phase terminal voltage Vu, which is the first voltage detection value, and the V-phase terminal voltage Vv, which is the second voltage detection value, are equal to each other (S106:YES and S108:YES). Specifically, it is determined that the inter-terminal short-circuit abnormality, in which the path for acquiring the U-phase terminal voltage Vu and the path for acquiring the V-phase terminal voltage Vv are short-circuited, is present. That is, when the first voltage detection value and the second detection value are equal for the predetermined period, the inter-terminal short-circuit abnormality is determined to be present between the path for acquiring the first voltage detection value and the path for acquiring the second voltage detection value.

Thus, it is possible to avoid that the two voltage detection values such as the U-phase terminal voltage Vu and the V-phase terminal voltage Vv whose voltage values temporarily become equal to each other even in the normal time, are determined to have the short-circuited abnormality in spite of no actual abnormality. It is possible to detect the abnormality of the voltage detection value correctly. Further, since it is possible to correctly detect the inter-terminal short-circuit by the abnormality detection processing irrespective of the arrangement of the terminals, the terminals may be arranged such that two voltage detection values of similar characteristics are acquired from the terminals, which are adjacent. That is, the arrangement of terminals can be designed with higher freedom. Here, the equality of the first voltage detection value and the second voltage detection value is not limited to the exact equality and allows certain differences, which may be caused due to sensor errors and calculation errors.

The abnormality detection part 60 determines that the motor 10 is in operation with electric power supply when the sum of squared values of the d-axis voltage command value Vd* and the q-axis voltage command value, which are related to driving of the motor 10, is equal to or larger than the current supply comparison threshold value Xi (S104:YES). Thus it is possible to appropriately check with less calculation whether the motor 10 is in operation with electric power supply. The abnormality detection part 60 determines that the steering wheel 91 is in operation when the steering angular velocity ω of steering the steering wheel 91 is equal to or larger than the steering comparison threshold value Xω (S105:YES). Thus it is possible to correctly check whether the steering wheel 91 is in operation.

In the first embodiment described above, the abnormality detection part 60 of the control unit 40 operates as a voltage signal acquisition part, a current supply detection part, a steering detection part and an abnormality detection part. S103, S104, S105 and S109 in FIG. 4 correspond to processing of functions of the voltage acquisition part, the current supply detection part, the steering detection part and the abnormality detection part, respectively. Further, the U-phase and the V-phase correspond to the first phase and the second phase, respectively. Of course, the U-phase and the W-phase may be the first phase and the second phase, respectively. The V-phase and either one of the U-phase and the W-phase may be the first phase and the second phase, respectively. The W-phase and either one of the U-phase and the V-phase may be the first phase and the second phase, respectively.

Second Embodiment

In the first embodiment, the inter-terminal short-circuit abnormality between the U-phase terminal voltage Vu and the V-phase terminal voltage Vv is detected. In a second embodiment, it is assumed for example that an input terminal Tm0, which receives a power supply voltage inputted through a regulator or the like, is provided adjacent to the input terminal Tm1, which receives the U-phase voltage Vu. Assuming that the voltage inputted from the input terminal Tm0 is the input voltage of a fixed voltage level (for example, 5[V]), it is likely that a voltage fixation abnormality, in which the U-phase voltage Vu is fixed continuously to the input voltage when the inter-terminal short-circuit arises between the input terminals Tm0 and Tm1.

In the second embodiment, for this reason, abnormality detection processing is performed to detect a voltage fixation abnormality, in which a short-circuit arises between an input terminal for receiving a fixed value and an input terminal for receiving a voltage detection value varying with time when the motor 10 is being supplied with electric power supply. Here, the voltage detection value is assumed to be the U-phase terminal voltage Vu, for example. Here, the voltage fixation abnormality is considered to be one example of the inter-terminal short-circuit abnormality.

The abnormality detection processing in the second embodiment will be described with reference to a flowchart shown in FIG. 5. The abnormality detection processing is executed by the abnormality detection part 60 at every predetermined interval while the ignition power is being supplied, for example. Processing of S201 to S205 is similar to S101 to S105 (FIG. 4) of the first embodiment. When determination of S204 or S206 results in NO, the count value C is reset and S209 is executed.

At S206, it is checked whether a present value Vu(n), which is the U-phase terminal voltage Vu acquired at present time, equals a preceding value Vu(n−1), which is the U-phase terminal voltage acquired at preceding time. When an absolute value of a difference between the present value Vu(n) and the preceding value Vu(n−1) is equal to or smaller than a fixation comparison threshold value Xf, it is determined that the present value Vu(u) and the preceding value Vu(n−1) equal each other. The fixation comparison threshold value Xf is set to a value close to zero in consideration of sensor errors and the like. When it is determined that the present value Vu(n) and the preceding value Vu(n−1) are not equal to each other (S206:NO), that is, the absolute value of the difference between the present value Vu(n) and the preceding value Vu(n−1) is larger than the fixation comparison threshold value Xf because of changes in the U-phase voltage Vu with time, the count value C of the counter is reset and then S209 is executed. When it is determined that the present value Vu(n) and the preceding value Vu(n−1) are equal to each other (S207:YES), that is, the absolute value of the difference between the present value Vu(n) and the preceding value Vu(n−1) is equal to or smaller than the fixation comparison threshold value Xf, that is, when the U-phase voltage Vu does not change with time, S207 is executed.

Figure 4:
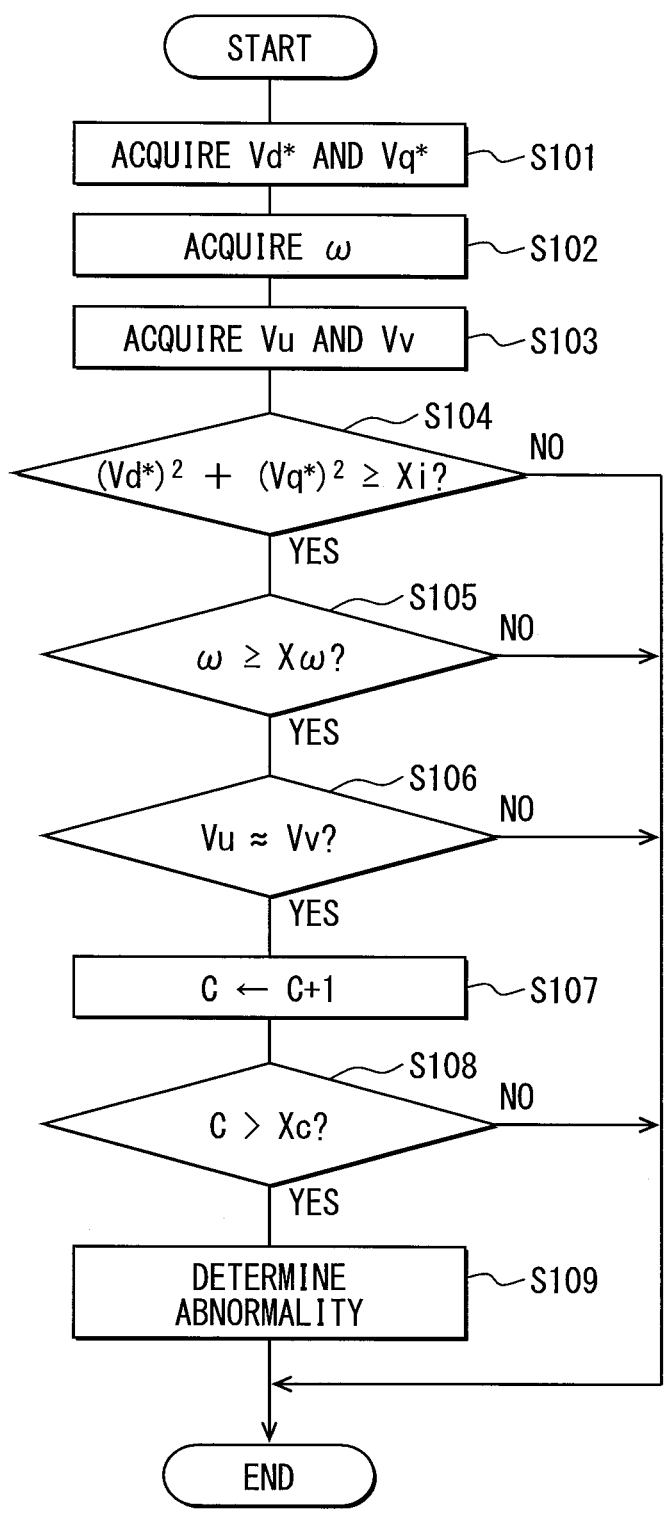
FIG. 4 is a flowchart showing abnormality detection processing in the first embodiment.

The abnormality detection processing of S207 is similar to the abnormality detection processing of S107 of FIG. 4. At S208, it is checked whether equality of the present value Vu(n) and the preceding value Vu(n−1) continues for more than a predetermined period. Similarly to S108 of FIG. 4, it is determined that the equality between the present value Vu(n) and the preceding value Vu(n−1) continues for more than the predetermined period when the count value C is larger than the count comparison threshold value Xc. When it is determined that the equality between the present value Vu(n) and the preceding value Vu(n−1) does not continue for more than the predetermined period (S208:NO), that is, the count value C is equal to or smaller than the count comparison threshold value Xc, S209 is executed. Here, the count value C is not reset but maintained. When it is determined that the equality between the present value Vu(n) and the preceding value Vu(n−1) continues for more than the predetermined period (S208:YES), that is, the count value C is larger than the count comparison threshold value Xc, S210 is executed.

At S209, which is executed when any one of S204, S205, S206 and S208 results in NO, the present value Vu(n) is maintained. The present value Vu(n), which is maintained, is used as the preceding value Vu(n−1) in the next processing. When S208 results in YES, that is, it is determined that the equality between the present value Vu(n) and the preceding value Vu(n−1) continues for more than the predetermined period, it is determined at S210 that the U-phase terminal voltage Vu has the fixation abnormality.

In the second embodiment, the fixation abnormality is detected by comparing the present value Vu(n) and the preceding value Vu(n−1) of one voltage detection value (in this example, U-phase terminal voltage Vu). It is thus possible to detect the fixation abnormality without using plural voltage detection values.

The abnormality detection part 60 determines that the U-phase terminal voltage Vu is abnormal when the present value Vu(n) and the preceding value Vu(n−1) of the voltage detection value continues to be equal to each other for more than the predetermined period (S205:YES, S208:YES). It is thus possible to correctly check the fixation abnormality such as a short-circuit of the voltage acquisition path for acquiring the U-phase terminal voltage Vu to the power supply line or the ground line. Here, the equality between the present value and the preceding value is not limited to absolute or complete equality but may include small differences such as sensor error and calculation error. The second embodiment also provides the similar advantages as the first embodiment described above.

Figure 5:
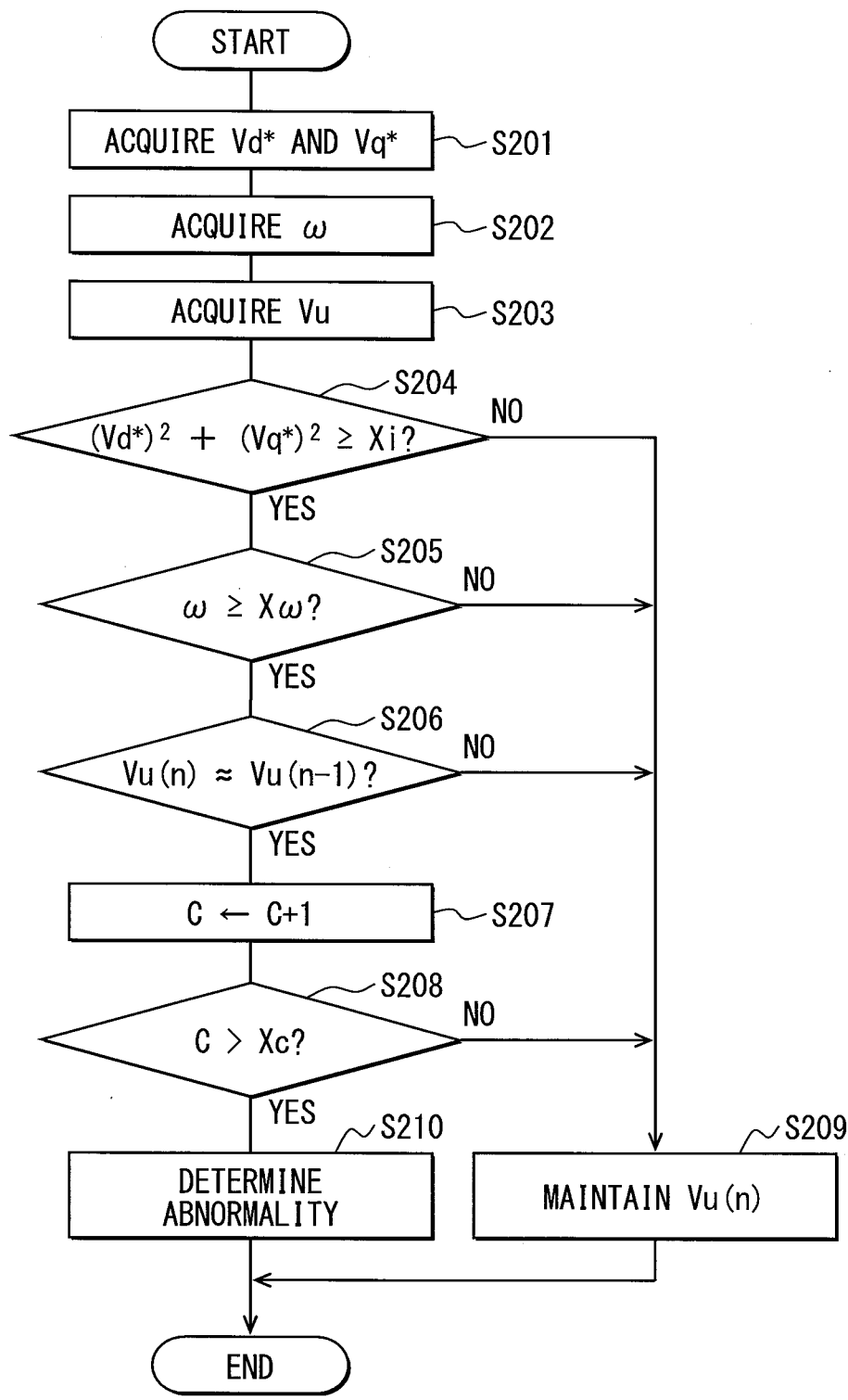
FIG. 5 is a flowchart showing abnormality detection processing in a second embodiment.

In the second embodiment, S203, S204, S205 and S209 in FIG. 5 correspond to processing of a function of the voltage acquisition part, processing of a function of the current supply detection part, processing of a function of the steering detection part and processing of a function of the abnormality detection part, respectively.

Other Embodiment (A) Voltage Detection Value

The first embodiment is described assuming that the voltage detection values are the U-phase terminal voltage Vu and the V-phase terminal voltage Vv, the first voltage detection value is the U-phase terminal voltage Vu and the second voltage detection value is the V-phase terminal voltage Vv.

The abnormality detection processing may be performed similarly by assuming that the voltage detection value is the U-phase current detection signal of the motor 10, which is exemplified as the voltage detection value in the second embodiment described above, the V-phase current detection signal, the W-phase current detection signal, the rotation signals SIN, COS, the torque signal TRQ and the steering angle signal.

Since the switching elements are switched over to turn on and off when the current is flowing to the motor 10, temperature of the switching elements rises because of switching loss. For this reason, the voltage detection value may be assumed to be a detection value of a temperature detection element (for example, thermistor), which detects temperature of a switching element, by taking the temperature of the switching element into consideration as the operation parameter, which varies when the rotary electric machine is powered with electric power supply. Further, the voltage detection value may be any other detection value of an operation parameter, which varies when the motor 10 is being supplied with electric power supply. The order of arrangement of the terminals for acquiring various voltage detection values is not limited to the order described above but may be in any other order.

(B) Abnormality Detection Processing

The abnormality detection processing may be performed on all voltage detection values of terminals, to which an input terminal or a connector terminal is adjacent. Further, differently from the abnormality detection processing performed in a case that the voltage detection values acquired from the adjacent terminals in the embodiment described above, the abnormality detection processing may be performed as separate processing by omitting the abnormality detection processing of S101, S102, S104 and S105 of FIG. 4, for example, in a case that characteristics of the voltage detection values are not similar.

In the embodiments described above, the predetermined period is measured based on the count value C of the counter. The predetermined period may be measured by using a timer or the like in place of the counter. The order of processing of S101 to S106 in FIG. 4 may be changed so far as S101, S102 and S103 are executed before S104, S105 and S106, respectively. Similarly, the order of processing of S201 to S206 in FIG. 5 may be changed so far as S201, S202 and S203 are executed before S204, S205 and S206, respectively.

In addition, as a first step of the abnormality detection processing, it may be checked whether the power supply relay is in a turned-on state. When it is determined that the power supply relay is in the turned-on state, S101 may be executed in FIG. 4. When it is not determined that the power supply relay is in the turned-on state, the abnormality detection processing may be cancelled. This modification may also be implemented in the abnormality detection processing of FIG. 5.

(C) Current Supply Detection Part

In the embodiments described above, it is determined that the motor 10 is in operation with electric power supply based on the sum of the squares of the d-axis voltage command value Vd* and the q-axis voltage command value Vq*, when the sum of the squares is equal to or larger than the current supply comparison threshold value Xi. Alternatively, it may be determined that the motor 10 is in operation with electric power supply when all of the absolute values of the phase voltage command values Vu*, Vv* and Vw* are equal to or larger than a current supply comparison threshold value Xi2, that is, |Vu*|≥Xi2, |Vv*|≥Xi2 and |Vw*|≥Xi2.

In this case, each of the voltage command values Vu*, Vv* and Vw* are acquired at S101 in FIG. 4 in place of the d-axis voltage command value Vd* and the q-axis voltage command value Vq*. S201 in FIG. 5 may also be executed similarly.

It may also be determined that the motor 10 is in operation with electric power supply when all of absolute values, which are calculated by subtracting the duty command values Du, Dv and Dw from 50, respectively, are equal to or larger than a current supply comparison threshold value Xi3, that is, |50−Du|≥Xi3, |50−Dv|≥Xi3 and |50−Dw|≥Xi3.

In this case, the duty command values Du, Dv and Dw of each phase are acquired at S101 in FIG. 4 in place of the d-axis voltage command value Vd* and the q-axis voltage command value Vq*. S201 in FIG. 5 may also be executed similarly. The current supply comparison threshold values Xi2 and Xi3 are set to values, which are close to zero in consideration of sensor errors and the like.

(D) Steering Detection Part

In the embodiments described above, the steering angular velocity ω is calculated based on the steering angle θh acquired from the steering angle sensor. Alternatively, an estimated steering angular velocity ωe calculated based on the electric angle θm or the like of the motor 10, for example, in place of the steering angular velocity ω calculated based on the steering angle θh.

(E) Current Sensor

In the embodiments described above, the current sensor part 30 is formed of the shunt resistors and provided between the switching element pairs and the ground. Alternatively, the current sensor part 30 may be provided between the switching element pairs and the high-potential power line or between the switching element pairs and the coil of the motor 10. Further, the current sensor part 30 is not limited to the shunt resistors but may be Hall elements or the like.

What is claimed is:

1. A rotary electric machine control apparatus for controlling driving of a rotary electric machine, which generates assist torque in accordance with steering torque inputted by steering operation on a steering member, the control apparatus comprising:
   a voltage signal acquisition part for acquiring a voltage detection value related to an operation parameter, which varies when the rotary electric machine is in operation with electric power supply to plural phase terminals of the rotary electric machine;
   a power supply check part for checking whether electric power is supplied to the rotary electric machine;
   a steering check part for checking whether the steering member is in operation; and
   an abnormality detection part for checking whether the voltage detection value is abnormal based on a variation of the voltage detection value over a predetermined period under a condition that the rotary electric machine is in operation and the steering member is in operation,
   wherein the abnormality detection part detects a short-circuit abnormality in a case that voltage detection values of adjacent phase terminals of the rotary electric machine differ less than a predetermined threshold value.

2. The rotary electric machine control apparatus according to claim 1, wherein:
   the voltage signal acquisition part acquires, as the voltage detection values, a first voltage detection value and a second detection value; and
   the abnormality detection part determines that the first voltage detection value and the second voltage detection value are abnormal, when the first voltage detection value and the second detection value are equal to each other over a predetermined period.

3. The rotary electric machine control apparatus according to claim 2, wherein:
   the first voltage detection value is a terminal voltage of a first phase of the rotary electric machine; and
   the second voltage detection value is a terminal voltage of a second phase of the rotary electric machine, which is different from the first phase.

4. The rotary electric machine control apparatus according to claim 1, wherein:
   the abnormality detection part determines that the voltage detection value is abnormal, when the voltage detection values of preceding time and present time are equal to each other over the predetermined period.

5. The rotary electric machine control apparatus according to claim 1, wherein:
   the power supply check part determines that the rotary electric machine is in operation, when a sum of square values of a d-axis voltage command value and a q-axis voltage command value, which are related to driving of the rotary electric machine.

6. The rotary electric machine control apparatus according to claim 1, wherein:
   the steering cheek part determines that the steering member is in operation, when an angular velocity of steering operation of the steering member is more than a steering detection threshold value.

7. A rotary electric machine control apparatus for controlling driving of a rotary electric machine, which generates assist torque in accordance with steering torque inputted by steering operation on a steering member, the control apparatus comprising:
   a voltage signal acquisition part for acquiring a voltage detection value related to an operation parameter, which varies when the rotary electric machine is in operation with electric power supply to plural phase terminals of the rotary electric machine;
   a power supply check part for checking whether electric power is supplied to the rotary electric machine;
   a steering check part for checking whether the steering member is in operation; and
   an abnormality detection part for checking whether the voltage detection value is abnormal based on a variation of the voltage detection value over a predetermined period under a condition that the rotary electric machine is in operation and the steering member is in operation,
   wherein the abnormality detection part detects a voltage fixation abnormality in a case that voltage detection values of a predetermined phase terminal of the rotary electric machine detected by the voltage signal acquisition part varies less than a predetermined threshold value for a predetermined period.

* * * * *